Patented Mar. 12, 1935

1,994,131

UNITED STATES PATENT OFFICE 1,994,131

PROCESS FOR THE PRODUCTION OF CINEOL

Clarence E. Greider, Cleveland, Ohio, assignor to Hercules Powder Company, Wilmington, Del., a corporation of Delaware No Drawing. Application March 19, 1932, Serial No. 600,071

10 Claims. (Cl. 260—153)

My invention relates to a method for the production of cineol by the treatment of pine oil and to the production of a solvent for nitrocellulose which includes cineol as a constituent by the treatment of pine oil.

Pine oil, usually produced by steam distillation of pine stump wood, is known to be a complex mixture of different substances. It, however, contains essentially the high boiling alcohols, terpineol, fenchyl alcohol and borneol. Pine oil itself has little or no colloiding or solvent action upon nitrocellulose and its individual constituents likewise possess little colloiding power. However, I have discovered that if pine oil be treated with a substantially concentrated acid under the proper temperature conditions, its constituent terpineol may be converted into cineol with the production of a nitrocellulose solvent of substantial value.

Further, I have discovered that if pine oil, prior to its treatment with acid, be oxidized for the production of camphor and fenchone from its constituents borneol and fenchyl alcohol, as, for example, in accordance with the process described in the application for patent of Irvin W. Humphrey, filed November 22, 1924, Serial No. 751,682, a nitrocellulose solvent of a high degree of efficiency will be obtained.

Having now indicated, in a general way, the nature and purpose of my invention, I will proceed to a more detailed description thereof.

For the production of cineol as a solvent for nitrocellulose from, for example, pine oil, there is added to the pine oil an acid, which may be organic or inorganic, for example, sulphuric acid, phosphoric acid, or oxalic acid, or the like, in an amount preferably equal in volume to the volume of pine oil, but which may be varied from an amount in volume one-half of the volume of the pine oil to an amount in volume in excess of the volume of the pine oil. The acid should be of substantial concentration, preferably 44% by weight (30% by volume), but the concentration may range from 30%–50% by weight (20%–40% by volume) with satisfactory results.

After the addition of the acid to the pine oil, it should be stirred vigorously with the application of heat. For example, vigorous stirring for a period of six hours at a temperature of forty degrees C. will suffice, though it may be noted that the length of the stirring period may be increased or decreased by a decrease or increase of the temperature, while the temperature may be varied considerably with the concentration of acid used.

While the temperature used in carrying out the process may be widely varied under varying conditions, as, for example, of acid concentration, pressure, etc., the use of a temperature at which any substantial dehydration of terpineol will be effected; i. e. a breaking down into terpenes and water, will be avoided, it being understood that the cineol is formed by molecular rearrangement of the terpineol without loss of water. Thus by way of illustration and not by way of limitation where a relatively concentrated acid is used and the process carried out under atmospheric pressure a temperature within, for example, the range 40–60° C. will be found to be satisfactory.

The addition of the acid to the pine oil, with the application of heat and stirring, results in a rearrangement of the terpineol, having a boiling point about 218° C., and similar alcohol constituents of the pine oil to form cineol, having a boiling range of about 175° C.–177° C. and probably other nitrocellulose solvents having a similar boiling range.

After the requisite stirring of the pine oil and acid to effect the production of cineol from the terpineol constituent of the pine oil, it is separated, washed with an alkali solution to neutralize any acid remaining, and finally steam distilled in the usual manner.

In the carrying out of the process, for the production of cineol as a nitrocellulose solvent, the pine oil may be oxidized for the production of camphor and fenchone before treatment with an acid.

To the pine oil, which, as has been indicated, contains, in addition to terpineol and similar alcohols, borneol and fenchyl alcohol, there is added an oxidizing agent, comprising, for example, sodium bichromate, sulphuric acid and water. The pine oil and oxidizing agent are stirred and cooled. The oxidized pine oil, which contains camphor and fenchone, as a result of the oxidation process, as well as terpineol, is then treated with acid, as above described, for the production of cineol from the terpineol constituent.

As an example of a satisfactory formula for the oxidation of pine oil, there may be added to 100 grams of pine oil a mixture composed, for example, of 20 grams sodium bichromate, 30 grams of concentrated sulphuric acid and 65 grams of water, with treatment as above described.

As a result of my invention, there is provided a valuable solvent for nitrocellulose and a simple and inexpensive method of producing the same either from ordinary pine oil or from pine oil which has been oxidized for the production of camphor and fenchone as solvents for nitrocellulose. When the process is utilized in connection with oxidized pine oil, it possesses great advantages of economy, since the amount of oxidizing agent may be greatly decreased and a solvent of greatly increased value over oxidized pine oil is produced.

This application is filed as a continuation in part of an application filed by me November 3, 1925, Serial Number 66,683.

What I claim and desire to protect by Letters Patent is:

1. The method of producing cineol which includes treating pine oil having terpineol as a constituent with a mineral acid and at a temperature below that at which substantial dehydration of terpineol wil be effected.

2. The method of producing cineol which includes treating pine oil having terpineol as a constituent with sulphuric acid and at a temperature below that at which substantial dehydration of terpineol will be effected.

3. The method of producing cineol which includes treating pine oil having terpineol as a constituent with substantially concentrated sulphuric acid at a temperature below that at which substantial dehydration of terpineol will be effected, for the production of cineol.

4. The method of producing cineol which includes oxidizing pine oil having terpineol as a constituent and treating the oxidized pine oil with a mineral acid and at a temperature below that at which substantial dehydration of terpineol will be effected, for the production of cineol.

5. The method of producing cineol which includes treating pine oil having terpineol as a constituent with a substantially concentrated mineral acid and at a temperature below that at which substantial dehydration of terpineol will be effected.

6. The method of producing cineol which includes oxidizing pine oil having terpineol as a constituent and treating the oxidized pine oil with sulphuric acid and at a temperature below that at which substantial dehydration of terpineol wil be effected to effect the production of cineol.

7. The method of producing cineol which includes treating pine oil having terpineol as a constituent with sulphuric acid of 30-50% concentration at a temperature of the order of 40-60° C.

8. The method of producing cineol which includes treating pine oil having terpineol as a constituent with sulphuric acid of 30-50% concentration and at a temperature below that at which substantial dehydration of terpineol will be effected, for the production of cineol.

9. The method of producing cineol which includes treating pine oil having terpineol as a constituent with phosphoric acid and at a temperature below that at which substantial dehydration of terpineol will be effected, for the production of cineol.

10. The method of producing cineol which includes oxidizing pine oil having terpineol as a constituent and treating the oxidized pine oil with phosphoric acid and at a temperature below that at which substantial dehydration of terpineol will be effected, for the production of cineol.

CLARENCE E. GREIDER.